United States Patent [19]

Maruyama et al.

[11] Patent Number: 4,843,517
[45] Date of Patent: Jun. 27, 1989

[54] FILM CAPACITOR

[75] Inventors: Kazumasa Maruyama; Tohru Chiba; Minoru Takamizawa, all of Niigata, Japan

[73] Assignee: Shin-Etsu Chemical Co., Ltd., Tokyo, Japan

[21] Appl. No.: 280,475

[22] Filed: Dec. 6, 1988

[30] Foreign Application Priority Data

Dec. 7, 1987 [JP] Japan ................................. 62-309170

[51] Int. Cl.$^4$ ........................... H01G 4/02; H01B 3/18
[52] U.S. Cl. ...................................... 361/323; 252/573
[58] Field of Search ......................... 252/573; 361/323

[56] References Cited

U.S. PATENT DOCUMENTS 3,900,416  8/1975  Vincent ................................. 252/573

Primary Examiner—Donald A. Griffin
Attorney, Agent, or Firm—Millen, White & Zelano

[57] ABSTRACT

The dielectric polymeric film in the inventive film capacitor is formed from a cyanoalkyl-containing organopolysiloxane represented by the average unit formula $$R^1_a R^2_b SiO_{(4-a-b)/2},$$

in which $R^1$ is a cyanoalkyl group having 3 to 5 carbon atoms, $R^2$ is a hydrogen atom, monovalent hydrocarbon group or halogenated monovalent hydrocarbon group, the subscript a is a positive number in the range from 0.8 to 1.8 and the subscript b is zero or a positive number not exceeding 1.0 with the proviso that a+b is in the range from 1.1 to 1.98. As compared with films of conventional cyanoethylated polymers and fluorocarbon resins used for the same purpose, such an organopolysiloxane film is very advantageous as a dielectric film of film capacitors in respect of the large dielectric constant, small dielectric loss, small moisture absorption and excellent thermal stability so that the film capacitor of the invention exhibits greatly upgraded performance.

3 Claims, No Drawings

FILM CAPACITOR

BACKGROUND OF THE INVENTION

The present invention relates to a film capacitor or, more particularly, to a capacitor in which the dielectric film material is formed of a unique organosilicon compound having excellent dielectric properties, e.g., a large dielectric constant and relatively low dielectric loss, low moisture absorption, excellent mechanical properties as a film and stability even at an elevated temperature.

It is an outstanding trend in the electronic industry in recent years that various instruments and equipments are required to be compactly designed with a decreased weight and accordingly various electronic components and parts are also requireed to be small in size and light in weight. Capacitors and other electronic devices in which highly dielectric materials play an important role do not make an exception. One of the key factors in order to satisfy this requirement in film capacitors, as a class of capacitors manufactured using dielectric films, is to use a film of a dielectric polymer having a greatly increased dielectric constant and other dielectric properties without affecting other important parameters as a constituent of film capacitors such as moisture absorption, mechanical strengths and thermal stability.

Examples of polymeric materials conventionally used as a dielectric film include cyanoethylated polysaccharides such as cyanoethyl cellulose, cyanoethyl starch, cyanoethyl pullulan and the like, cyanoethylated products of polysaccharide derivatives such as cyanoethyl hydroxyethyl cellulose, cyanoethyl glycerol pullulan and the like, cyanoethylated polyol compounds such as cyanoethylated polyvinyl alcohol and the like, fluorocarbon resins such as poly(vinylidene fluoride) and so on.

These conventional polymeric materials, however, have several disadvantages as a dielectric film material and not quite satisfactory in the electric and electronic applications. For example, the cyanoethylated products of polysaccharides, polysaccharide derivatives and polyvinyl alcohol above mentioned have a defect in common that the moisture absorption thereby is so large that the dielectric properties thereof are subject to a great decrease in a humid atmosphere and the reliability of the electric and electronic instruments constructed by using, for example, film capacitors prepared with the polymer is greatly affected. This problem of course can be solved to some extent by undertaking some measures of humidity control and removal of absorbed moisture in the manufacturing process of film capacitors although the productivity of the process is unavoidably decreased so much even by setting aside the problem that no complete solution of the problem can be obtained at any rate.

In addition, cyanoethyl cellulose and cyanoethyl starch have a problem as a film-forming polymer so that satisfactory polymeric films of these polymers can be prepared only with a great difficulty. Further, cyanoethylated hydroxyethyl cellulose, cyanoethylated glycerol pullulan and cyanoethylated polyvinyl alcohol are defective in respect of the large temperature dependency of the dielectric constant.

Fluorocarbon resins such as poly(vinylidene fluoride) are not advantageous as a material of dielectric films in film capacitors because of their small dielectic constant which is only about a half of that of the above described cyanoethylated polymers although they have advantages in the small moisture absorption and small temperature dependency of the dielectric constant.

SUMMARY OF THE INVENTION

The present invention accordingly has an object to provide a novel film capacitor free from the disadvantages and problems in film capacitors due to the use of the above described conventional polymers as a material of the dielectric films.

Thus, the present invention provides a film capacitor of which the dielectric film is formed of an organopolysiloxane represented by the average unit formula $$R^1_a R^2_b SiO_{(4-a-b)/2}, \tag{I}$$

in which $R^1$ ia a cyanoalkyl group having 3 to 5 carbon atoms, $R^2$ is a hydrogen atom, monovalent hydrocarbon group or halogenated monovalent hydrocarbon group, a is a positive number in the range from 0.8 to 1.8 and b is zero or a positive number not exceeding 1.0 with the proviso that $a+b$ is in the range from 1.1 to 1.98.

DETAILED DESCRIPTION OF THE PREFERRED EMBODIMENTS

As is described above, the essential feature of the inventive film capacitor is that the dielectric film as a constituent thereof is formed of a specific organopolysiloxane having cyanoalkyl groups bonded to the silicon atoms. It is presumable that the high polarity of the cyano group -CN contributes to the orientation and polarization thereof in an electric field thus to increase the dielectric constant of the polymeric film.

In the above given average unit formula (I), the group denoted by $R^1$ is a straightly linear or branched cyanoalkyl group having 3 to 5 carbon atoms. Examples of the linear cyanoalkyl groups include 2-cyanoethyl, 3-cyanopropyl and 4-cyanobutyl groups and examples of the branched cyanoalkyl groups include 2-cyanopropyl, 2-cyanobutyl, 3-cyanobutyl and 2-methyl-2-cyanopropyl groups though not limited thereto. Among the above named cyanoalkyl groups, 2-cyanoethyl and 3-cyanopropyl groups are particularly preferred. When the number of carbon atoms in the cyanoalkyl group exceeds 5, the bulkiness of the substituent groups may cause some difficulties in the synthetic reaction for introducing the cyanoalkyl groups into the organopolysiloxane. The above named cyanoalkyl groups can be contained in the organopolysiloxane molecules either singly or as a combination of two kinds or more according to need.

The number of the cyanoalkyl groups contained in the organopolysiloxane is preferably in the range from 0.8 to 1.8 per atom of silicon as is shown by the value of the subscript a in the average unit formula (I). When the amount of the cyanoalkyl groups is too small, the dielectric constant of the organopolysiloxane or a dielectric film prepared therefrom is decreased as a result of the decreased content of the cyano groups. Increase of the amount of the cyanoalkyl groups over the above mentioned upper limit is undesirable due to the problem in the mechanical properties of the dielectric film in addition to the difficulty in the synthetic reaction for introducing the cyanoalkyl groups into the organopolysiloxane.

The organopolysiloxane molecules may have substituent atoms or groups bonded to the silicon atoms other than the above mentioned cyanoalkyl groups as denoted by the symbol $R^2$ in the average unit formula (I). The atom or group denoted by the symbol $R^2$ is selected from the class consisting of a hydrogen atom, monovalent hydrocarbon groups and halogenated monovalent hydrocarbon groups. The monovalent hydrocarbon groups are exemplified by alkyl groups, e.g., methyl, ethyl, propyl and butyl groups, cycloalkyl groups, e.g., cyclohexyl and cycloheptyl groups, alkenyl groups, e.g., vinyl group, aryl groups, e.g., phenyl and tolyl groups, and aralkyl groups, e.g., benzyl and 2-phenylethyl groups. The halogenated monovalent hydrocarbon groups can be obtained by replacing a part or all of the hydrogen atoms in the above named hydrocarbon groups with atoms of a halogen, e.g., chlorine and fluorine, as exemplified by chloromethyl, 3.3.3-trifluoropropyl and 6,6,6-trifluorohexyl groups.

These groups denoted by $R^2$ are not essential in the organopolysiloxane. Accordingly, the subscript b in the average unit formula (I) can be zero. It is, however, preferable that the value of the subscript b is a positive number in the range from 0.1 to 1.0. When the amount of the groups $R^2$ is too large, a decrease may be caused in the amount of the cyanoalkyl groups accordingly, especially, when the value of a+b is relatively small.

It is essential that the value of a+b of the subscripts in the average unit formula (I) is in the range from 1.1 to 1.98. In other words, the number of the substituent atoms and/or groups per silicon atom in the organopolysiloxane should be 1.1 to 1.98. A value of a+b smaller than 1.1 means that the organopolysiloxane is no longer film-forming but is a very brittle resinous form. When the value of a+b is larger than 1.98, the orgnopolysiloxane is oily and no film can be prepared therefrom.

The cyanoalkyl-containing organopolysiloxane can be prepared by any known method conventionally undertaken in the organosilicon chemistry for the synthetic preparation of various organopolysiloxanes in general. For example, an organosilane compound having a cyanoalkyl group and one or more hydrolyzable atoms or groups bonded to the silicon atom is hydrolyzed either alone or as a mixture with other silane compounds having silicon-bonded hydrolyzable groups and the hydrolysis product is subjected to a polymerization reaction. The synthetic method may include various known reactions such as the addition reaction, dealcoholation condensation reaction, dehydration condensation reaction and the like in the presence or absence of known catalysts, preferably, in an organic solvent.

The above mentioned hydrolyzable group is not limited to a particular atom or group including halogen atoms, alkoxy groups, acyloxy groups and amino groups and the number of these hydrolyzable atoms and groups in a molecule of the silane compound may be 1, 2 or 3. Examples of the cyanoalkyl-containing hydrolyzable silane compounds include 2-cyanoethyl dimethyl chlorosilane, 3-cyanopropyl diethyl methoxy silane, 2-cyanoethyl dimethyl acetoxy silane, di(2-cyanoethyl) methyl methoxy silane and the like as the examples of the monofunctional silanes, 2-cyanoethyl chloromethyl dichlorosilane, 2-cyanoethyl 3,3,3-trifluoropropyl diethoxy silane, 3-cyanopropyl phenyl diaminosilane and the like as the examples of the difunctional silanes and 2-cyanoethyl triethoxy silane, 4-cyanobutyl trimethoxy silane and the like as the examples of the trifunctional silanes.

Examples of the hydrolyzable organosilane compounds having no cyanoalkyl groups and optionally cohydrolyzed with the above named cyanoalkyl-containing silane compounds include trimethyl chlorosilane, trimethyl methoxy silane, vinyl dimethyl ethoxy silane, triethyl aminosilane and the like as the examples of the monofunctional silanes, dimethyl dichlorosilane, methyl phenyl dichlorosilane, diphenyl dichlorosilane, vinyl methyl dichlorosilane, 3,3,3-trifluoropropyl dichlorosilane, dimethyl dimethoxy silane, vinly methyl dimethoxy silane, chloromethyl diethoxy silane and the like as the examples of the difunctional silanes, methyl trichlorosilane, vinyl trichlorosilane, trimethoxy silane, chloromethyl trimethoxy silane, phenyl trimethoxy silane, vinyl trimethoxy silane, 3,3,3-trifluoropropyl trimethoxy silane and the like as the examples of the trifunctional silanes and tetrachlorosilane, tetraethoxy silane and the like as the examples of the tetrafunctional silanes.

When the cyanoalkyl-containing organopolysiloxane is prepared by hydrolyzing or cohydrolyzing one or more of the above named hydrolyzable organosilane compounds of which the hydrolyzable group is a chlorine atom, it is important that the organopolysiloxane product is completely freed from hydrogen chloride formed by the hydrolysis since even a trace amount of hydrogen chloride is very detrimental against the dielectric properties of the films prepared from the organopolysiloxane.

It is of course optional that, instead of hydrolyzing or cohydrolyzing one or more of the above named hydrolyzable organosilane compounds as the starting material, preparation of the cyanoalkyl-containing organopolysiloxane used in the inventive film capacitor is started by using an oligomeric organopolysiloxane prepared in advance from the hydrolyzable silane compounds as the starting material.

The cyanoalkyl-containing organopolysiloxane prepared in the above described manner can be shaped into a film by a known method such as casting and spreading of a solution of the organopolysiloxane in a suitable organic solvent such as acetone, dimethyl formamide and the like followed by evaporation of the solvent. It is optional tht the film is prepared by admixing the cyanoalkyl-containing organopolysiloxane with a variety of known additives according to need such as organic and inorganic fillers, plasticizers, auxiliary resins having miscibility with the cyanoalkyl-containing organopolysiloxane and the like provided that the properties of the film are not disadvantageously affected thereby.

The film capacitor of the invention exhibits advantageous performance over conventional film capacitors by virtue of the specific dielectric films of the cyanoalkyl-containing organopolysiloxane having unique properties including the high dielectric constant and low dielectric loss, excellent mechanical properties of the film, outstandingly small moisture absorption as compared with other cyanoethylated polymers and high thermal decomposition temperature to ensure good performance of the capacitor at elevated temperatures. It should be understood that the application field of the above described cyanoalkyl-containing organopolysiloxane is not limited to film capacitors but also includes any other electric and electronic devices in which excellent dielectric properties of the material are essential along with other parameters as a polymeric material.

In the following, examples and comparative examples are given to illustrate the invention in more detail. In the following examples and comparative examples, the properties of the dielectric polymers were measured according to the procedures described below.

Dielectric properties

The polymer was dissolved in acetone and the solution was cast on and spread over an aluminum foil where the solution was heated at 80° C. for 4 hours to give a film having a thickness of about 50 μm by evaporating the solvent. The polymer film was coated on both surfaces with an aluminum layer to serve as electrodes by vacuum vapor deposition and the thus formed capacitor was subjected to the measurement of the electrostatic capacity and dielectric tangent at 25° C. at a frequency of 1 kHz using a LCR meter. The dielectric constant was calculated from the value of the dielectric tangent.

Mechanical properties

A film of the polymer having a thickness of about 100 μm was prepared in substantially the same manner as above. The tensile strength and ultimate elongation of the polymer film were measured using a tensile tester according to the procedure specified in JIS K 6732.

Moisture absorption

The polymer dried by heating at 120° C. for 2 hours was kept in an atmosphere of 75% relative humidity at 25° C. for 7 days and the amount of moisture absorption was determined from the weight increase in % by weight.

Thermal decomposition temperature

The polymer was subjected to the differential thermogravimetric analysis in air at a rate of temperature elevation of 10° C. per minute and the temperature at which a noticeable decrease was started in the weight was recorded as the thermal decomposition temperature.

EXAMPLE 1

Into a flask of 100 ml capacity were introduced 15.9 g of 2-cyanoethyl methyl dimethoxy silane and 21.7 g of 2-cyanoethyl triethoxy silane followed by agitation to form a 1:1 by moles mixture of a difunctional silane and trifunctional silane and the mixture was then admixed dropwise under agitation with 9 g of water containing 0.3 ml of a 15% by weight aqueous solution of tetramethyl ammonium hydroxide. The thus obtained clear, uniform mixture was heated at 90° C. for 2 hours to effect the reaction.

The thus obtained cyanoethyl-containing organopolysiloxane had following properties.

| | |
|---|---|
| Dielectric constant | 27 |
| Dielectric tangent | 0.052 |
| Tensile strength, kg/cm$^2$ | 50 |
| Ultimate elongation, % | >500 |
| Moisture absorption, % | 1.3 |
| Thermal decomposition temperature, °C. | 350 |

EXAMPLE 2

The experimental procedure was substantially the same as in Example 1 except that the amounts of 2-cyanoethyl methyl dimethoxy silane, 2-cyanoethyl triethoxy silane and water were 9.5 g, 30.4 g and 10 g, respectively. The molar ratio of the difunctional silane to the trifunctional silane was 0.43.

The thus obtained cyanoethyl-containing organopolysiloxane had following properties.

| | |
|---|---|
| Dielectric constant | 25 |
| Dielectric tangent | 0.045 |
| Tensile strength, kg/cm$^2$ | 250 |
| Ultimate elongation, % | 100 |
| Moisture absorption, % | 1.3 |
| Thermal decomposition temperature, °C. | 350 |

EXAMPLE 3

The experimental procedure was substantially the same as in Example 1 except that the amounts of 2-cyanoethyl methyl dimethloxy silane, 2-cyanoethyl triethoxy silane and water were 6.4 g, 34.7 g and 12 g, respectively. The molar ratio of the difunctional silane to the trifunctional silane was 0.25.

The thus obtained cyanoethyl-containing organopolysiloxane had following properties.

| | |
|---|---|
| Dielectric constant | 23 |
| Dielectric tangent | 0.036 |
| Tensile strength, kg/cm$^2$ | 430 |
| Ultimate elongation, % | 1.8 |
| Moisture absorption, % | 1.2 |
| Thermal decomposition temperature, °C. | 390 |

Comparative Example 1

A commercially available film of cyanoethyl cellulose (Acrylocel, a product by Tel Systems, Inc., U.S.A.) was subjected to the same tests as above to give the results shown below.

| | |
|---|---|
| Dielectric constant | 15 |
| Dielectric tangent | 0.036 |
| Tensile strength, kg/cm$^2$ | 310 |
| Ultimate elongation, % | 1.5 |
| Moisture absorption, % | 5.0 |
| Thermal decomposition temperature, °C. | 250 |

COMPARATIVE EXAMPLE 2

A cyanoethyl pullulan was prepared according to the procedure described in Japanese Patent Publication 59-31521. The product had an average molecular weight of 180,000 to 200,000 and the degree of substitution of cyanoethyl groups was 2.70. The cyanoethyl pullulan was shaped into a film and subjected to the same tests as above to give the results shown below.

| | |
|---|---|
| Dielectric constant | 18 |
| Dielectric tangent | 0.015 |
| Tensile strength, kg/cm$^2$ | 400 |
| Ultimate elongation, % | 4.5 |
| Moisture absorption, % | 4.8 |
| Thermal decomposition temperature, °C. | 250 |

COMPARATIVE EXAMPLE 3

A cyanoethylated polyvinyl alcohol was prepared according to the procedure described in Journal of Electrochemical Society, volume 111, No. 11, pages 1239 to 1243 (1964). The product had an average molecular weight of 140,000 to 160,000 and the degree of substitution of cyanoethyl groups was 80% by moles. The cyanoethylated polyvinyl alcohol was shaped into a film and subjected to the same tests as above to give the results shown below.

| | |
|---|---|
| Dielectric constant | 18 |
| Dielectric tangent | 0.070 |
| Tensile strength, kg/cm$^2$ | 50 |
| Ultimate elongation, % | >500 |
| Moisture absorption, % | 4.7 |
| Thermal decomposition temperature, °C. | 230 |

EXAMPLE 4

A silane mixture was prepared in a flask of 100 ml capacity from 10.9 g of 3-cyanopropyl methyl dichlorosilane and 26.3 g of 2-cyanoethyl trichlorosilane and further admixed dropwise with 5.0 ml of water followed by heating at 60° C. for 2 hours to effect the reaction. The organopolysiloxane thus formed was dissolved in 30 g of methylene chlortide and the solution was washed twice each with 50 ml of water to remove hydrogen chloride. Thereafter, methylene chloride in the solution was evaporated to dryness to leave the organopolysiloxane.

The organopolysiloxane was a transparent solid which gave a highly transparent, tough film by the method of casting of a solution thereof in acetone or dimethyl formamide. The film had following properties.

| | |
|---|---|
| Dielectric constant | 22 |
| Dielectric tangent | 0.030 |
| Moisture absorption, % | 1.4 |

EXAMPLE 5

A silane mixture of 9.6 g of 2-cyanoethyl 3,3,3-trifluoropropyl dimethoxy silane and 13.0 g of 2-cyanoethyl triethoxy silane was admixed with 5.0 ml of water and 0.1 ml of a 15% aqueous solution of tetramethyl ammonium hydroxide and the mixture was heated at 90° C. for 1 hour with agitation.

The thus obtained organopolysiloxane could give a transparent, tough film which had following properties.

| | |
|---|---|
| Dielectric constant | 27 |
| Dielectric tangent | 0.045 |
| Moisture absorption, % | 1.3 |

EXAMPLE 6

A silane mixture of 15.7 g of di(2-cyanoethyl) diethopxy silane and 5.0 g of tetramethoxy silane was admixed with 10.0 ml of water and 0.1 ml of acetic acid and the mixture was heated at 90° C. for 3 hours with agitation to effect the reaction.

The thus obtained organopolysiloxane could give a transparent film which had following properties.

| | |
|---|---|
| Dielectric constant | 26 |
| Dielectric tangent | 0.040 |
| Moisture absorption, % | 1.0 |

What is claimed is:

1. A film capacitor of which the dielectric film is formed of an organopolysiloxane represented by the average unit formula $$R^1_a R^2_b SiO_{(4-a-b)/2},$$

in which $R^1$ ia a cyanoalkyl group having 3 to 5 carbon atoms, $R^2$ is a hydrogen atom, monovalent hydrocarbon group or halogenated monovalent hydrocarbon group, the subscript a is a positive number in the range from 0.8 to 1.8 and the subscript b is zero or a positive number not exceeding 1.0 with the proviso that a+b is in the range from 1.1 to 1.98.

2. The film capacitor as claimed in claim 1 wherein the group denoted by $R^1$ is a 2-cyanoethyl group or a 3-cyanopropyl group.

3. The film capacitor as claimed in claim 1 wherein the value of the subscript b is in the range from 0.1 to 1.0.

* * * * *